United States Patent [19]

Ohe et al.

[11] Patent Number: 4,811,025
[45] Date of Patent: * Mar. 7, 1989

[54] AUTOMOTIVE ANTENNA SYSTEM

[75] Inventors: Junzo Ohe; Hiroshi Kondo, both of Aichi, Japan

[73] Assignee: Toyota Jidosha Kabushiki Kaisha, Toyota, Japan

[*] Notice: The portion of the term of this patent subsequent to Jul. 7, 2004 has been disclaimed.

[21] Appl. No.: 804,465

[22] Filed: Dec. 4, 1985

[30] Foreign Application Priority Data

Dec. 6, 1984 [JP] Japan .................. 59-258807

[51] Int. Cl.$^4$ .............................. H01Q 1/32
[52] U.S. Cl. ..................... 343/712; 343/713
[58] Field of Search ............... 343/711, 712, 713, 715

[56] References Cited

U.S. PATENT DOCUMENTS 3,717,876 2/1973 Volkers et al. ............... 343/712
4,679,052 7/1987 Ohe et al. .................... 343/712

FOREIGN PATENT DOCUMENTS 156031 12/1981 Japan .
168441 12/1981 Japan .

OTHER PUBLICATIONS

Japanese Pat. Abstract, vol. 6, No. 37 E-97, Mar. 6, 1982, 56-156031.
Japanese Pat. Abstract, vol. 6, No. 55 E-101 4/10/82, 56-168441.
Japanese Pat. Abstract, vol. 7, No. E-187, 7/15/83, 58-70640.
Japanese Pat. Abstract, vol. 7, No. 162 E-187, 7/15/83, 58-70642.
Abstract of 55-88407 Antenna Device, 7/4/1980.
Abstract of 60-169204 on Vehicle Antenna System, 9/2/1985.
Abstract of 60-172804 Antenna System for Vehicle, 9/6/1985.
English translation of German patent 1949828 (submitted earlier).
Japanese Abstract 56-62403 dated 5/28/81, vol. 5, No. 125.
Japanese Abstract 56-168441 dated 12/24/81, vol. 6, No. 55(E-101).
Japanese Abstract 58-70640 dated 4/27/83, vol. 7, No. 162(E-187).

Primary Examiner—William L. Sikes
Assistant Examiner—Robert E. Wise
Attorney, Agent, or Firm—Cushman, Darby & Cushman

[57] ABSTRACT

The present invention provides a diversity reception type automotive antenna system comprising a pole type antenna as a main antenna and a high-frequency pickup device as a sub-antenna. The high-frequency pickup is mounted on a connection between adjacent vehicle portions and functions to detect surface high-frequency currents induced on the vehicle body by radio or other waves which flow on the connection. The high-frequency pickup can readily be installed on the vehicle body without any externally projecting portion which would otherwise damage the aesthetic design of the vehicle body.

5 Claims, 11 Drawing Sheets

AUTOMOTIVE ANTENNA SYSTEM

BACKGROUND OF THE INVENTION

1. Field of the Invention

The present invention relates to a space diversity reception type automotive antenna system.

2. Description of the Prior Art

Antenna systems are essential for modern automobiles which must positively receive radio or other waves at their built-in receivers. Antenna systems also are very important for citizen band tranceivers each of which is used to effect the transmission and reception of waves between an automobile and other stationary or moving stations.

There is known a pole type antenna which projects outwardly from the vehicle body and which exhibits favorable reception performance. However, the pole type antenna tends to interfere with the aesthetic design of automobile.

Radio waves belonging to relatively high frequency bands, for example, VHF bands are higher in straight-advancing property. Direct waves tends to interfere with waves reflected by buildings and/or mountains to create a distortion in waves or multi-path noise by which voice signals are instantaneously interrupted. A single pole antenna cannot reduce the multi-path noise resulting from high frequency band reception.

Since the pole type antenna is directional, moreover, the reception of waves is varied each time that the direction of the moving automobile is changed relative to the incoming waves. It is therefore difficult to receive radio or waves steadily at the moving automobile utilizing a single pole antenna.

To overcome such a problem, there has been proposed a diversity reception type automotive antenna system comprising a pole antenna and rod-like sub-antenna which are spaced from each other. The antenna which can more efficiently receive waves at a particular time is automatically selected to improve the directional pattern of the entire antenna system.

The provision of an antenna rod other than the main pole antenna on the vehicle body is undesirable, because it complicates the installation of the automotive antenna system and also further damages the aesthetic appearance of the vehicle body.

Summary of the Invention

It is therefore an object of the present invention to provide a space diversity reception type automotive antenna system which comprises a pole type antenna projecting outwardly from the vehicle body and a sub-antenna which is not externally exposed from the vehicle body.

The sub-antenna is in the form of a high-frequency pickup device which can detect surface high-frequency currents induced on the vehicle body by radio or other waves which flow on a connection between adjacent vehicle portions. Such a high-frequency pickup device can readily be installed on the vehicle body without further damaging the aesthetic appearance of the vehicle body.

DETAILED DESCRIPTION OF PREFERRED EMBODIMENTS

Referring first to FIGS. 12 to 17, there is shown a process of searching the distribution of surface currents on the vehicle body and determining a location at which an automotive antenna system according to the present invention can most efficiently operate.

Figure 12:
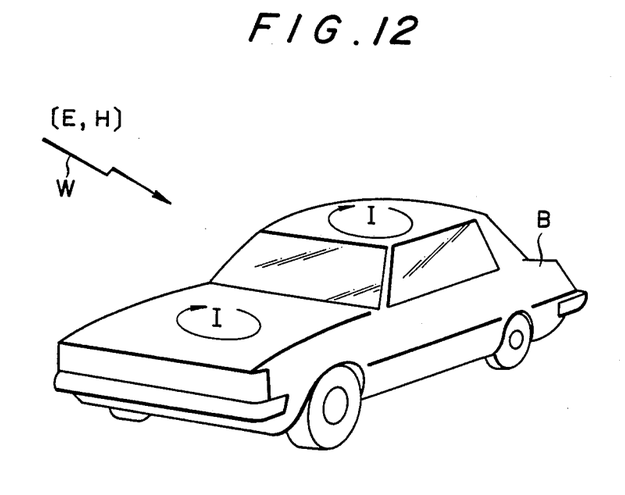
FIG. 12 illustrates surface currents I induced on the vehicle body B by external waves W.

FIG. 12 shows the fact that when external waves W such as radio or other waves pass through the vehicle body B of electrically conductive metal, surface currents I are induced on the vehicle body at various locations with a level corresponding to the intensity of the external waves. The present invention is intended to receive radio or other waves belonging to bands of relatively high frequencies which are typically equal to or higher than 50 MHz.

For such particular high-frequency bands, the distribution of surface currents induced on the vehicle body by radio or waves belonging to these bands are measured to determine a location at which the density of surface currents is higher with less noise. To this end, a simulation is carried out by the use of a computer and also the intensity of currents is actually measured on the vehicle body at various locations. The actual measurements of current intensity is made by using a probe constructed and functioning in accordance with the same principle as that of a high-frequency pickup device which is included in an automotive antenna system according to the present invention, as will be described hereinafter. The probe is moved over the entire surface of the vehicle body while being angularly rotated at the respective locations on the vehicle body.

Figure 13:
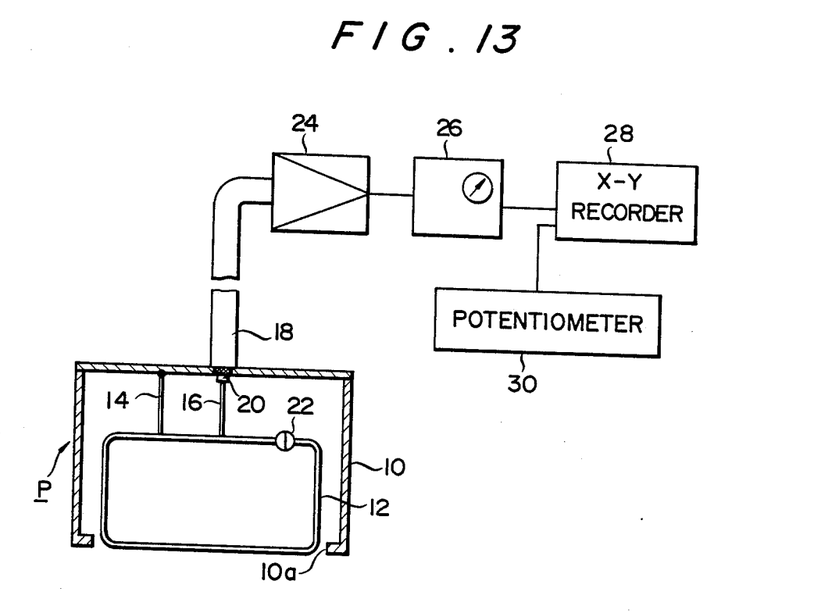
FIG. 13 illustrates a probe and its processing circuit used to determine the distribution of surface currents on the vehicle body, the probe being constructed and functioning in accordance with the same principle as that of the high-frequency pickup device used in the present invention.

FIG. 13 shows a probe P suitable for use in such measurements. The probe P includes a casing 10 of electrically conductive material and a loop coil 12 located within the casing 10 and shielded from any undesirable and external waves by the casing 10. The casing 10 is provided with an opening 10a through which a portion of the loop coil 12 is externally exposed. The exposed portion of the loop coil 12 is disposed in close proximity to the surface of the vehicle body B such that the loop coil 12 can detect a magnetic flux formed by the surface currents on the vehicle body. The loop coil 12 is electrically connected with the casing 10 through a short-circuiting line 14. The output terminal 16 of the loop coil 12 is electrically connected with a core 20 in a coaxial cable 18. The loop coil 12 includes a capacitor 22 for causing the frequency of the loop coil 12 to resonate with a desired frequency to be measured to improve the efficiency of picking-up.

As seen from FIG. 13, the output of the probe P is amplified by a high-frequency voltage amplifier 24 the output voltage of which in turn is measured by a high-frequency voltage measuring device 26. At the same time, the output voltage measured by the voltage measuring device 26 is recorded by an X-Y recorder 28 as a signal indicative of the level of the surface currents on the vehicle body at each of the locations. The X-Y recorder 28 also receives a signal indicative of the corresponding location on the vehicle body. Therefore, one can know the level of the surface high-frequency currents on the vehicle body at each of the respective locations.

Figure 14:
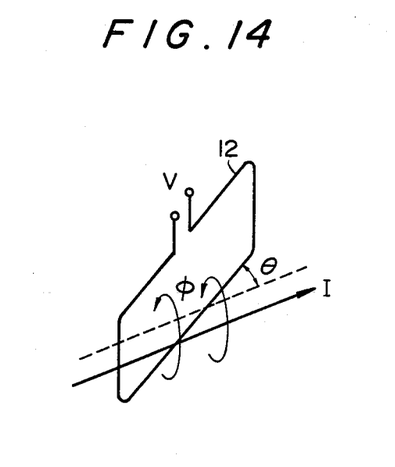
FIG. 14 illustrates the electromagnetic coupling between the surface currents I and a loop antenna in the pickup.
Figure 15:
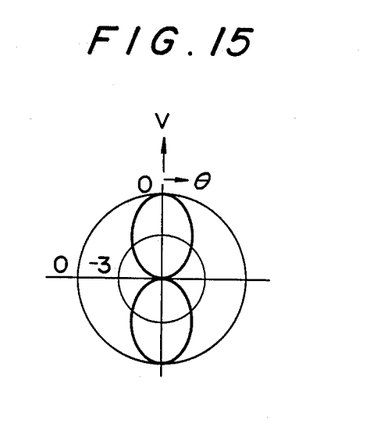
FIG. 15 illustrates the directional pattern of the loop antenna shown in FIG. 14.

FIG. 14 shows a deviation $\theta$ between the surface high-frequency currents I and the loop coil 12 of the probe P. As seen from this figure, a magnetic flux $\theta$ formed by the surface, currents I intersects the loop coil 12 to create a voltage V to be detected in the loop coil 12. If the deviation $\theta$ becomes equal to zero, that is, the loop coil 12 of the probe P becomes parallel to the direction of the surface currents I flowing on the vehicle body as shown in FIG. 15, the voltage will be maximum. When the probe P is angularly rotated at each of the locations on the vehicle body to sense the maximum voltage, one can know the direction of the surface currents I flowing on the vehicle body at that location.

Figure 16:
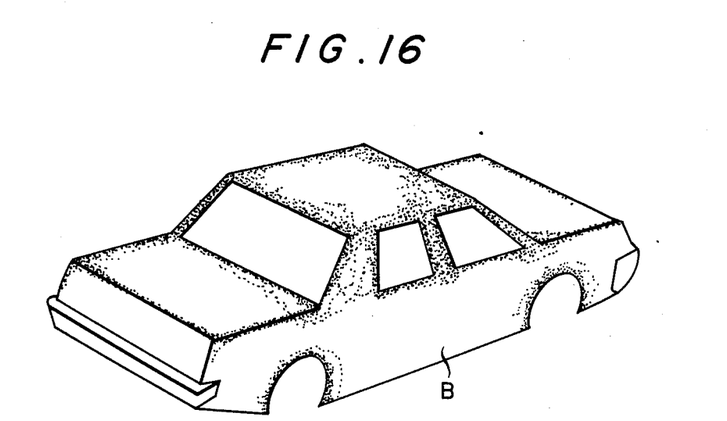
FIG. 16 illustrates the distribution of surface current intensity on the vehicle body.
Figure 17:
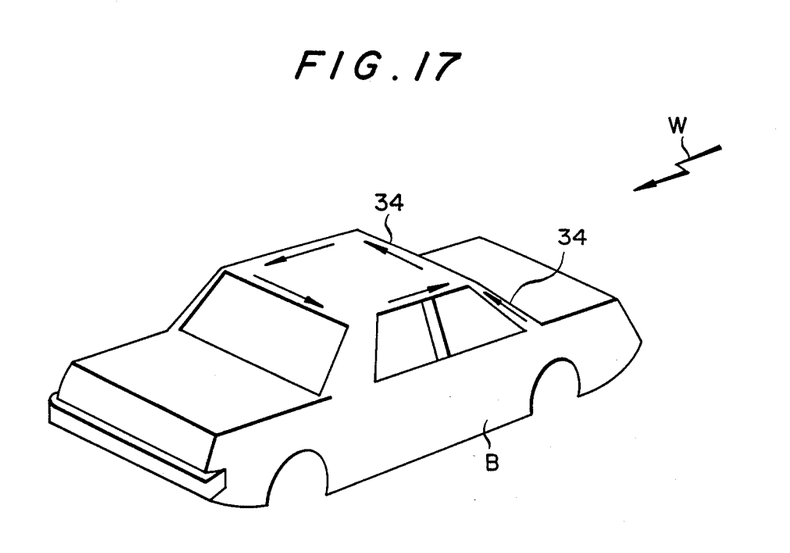
FIG. 17 illustrates the orientation of surface currents on the vehicle body.

FIGS. 16 and 17 illustrate the level and orientation of the surface high-frequency currents which are induced on the vehicle body at the respective locations by radio or other waves having a frequency equal to 80 MHz and which are determined by the simulation of the computer and the actual measurements of the probe P. As seen from FIG. 16, the density of the surface currents are higher near the marginal edges of various flat vehicle portions and on the contrary minimum adjacent to the center of each of the flat vehicle portions.

It is also understood from FIG. 17 that the surface currents flow concentrically in the marginal edges of the vehicle body and in the front pillars of the vehicle body each of which defines a connection between adjacent flat vehicle portions.

Figure 1:
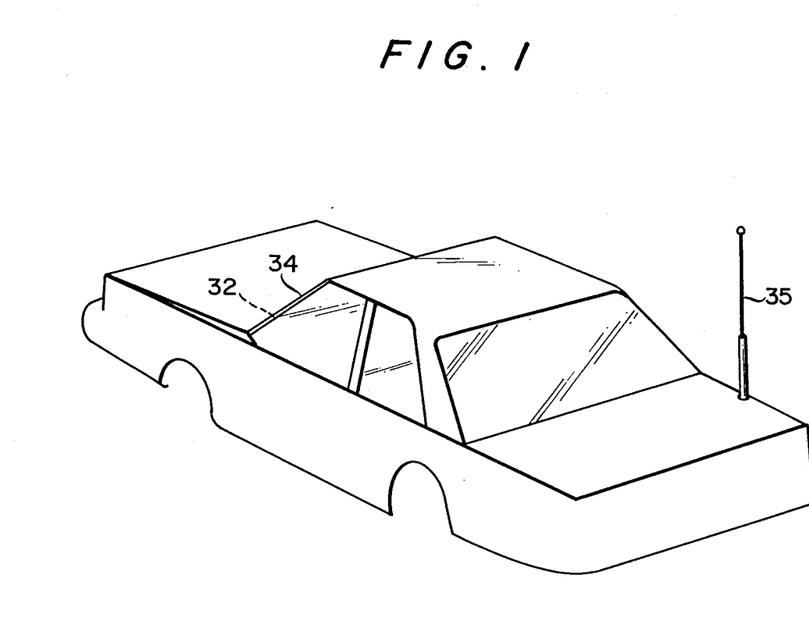
FIG. 1 is a perspective view of an automobile having one embodiment of a space diversity reception type automotive antenna system according to the present invention, which comprises a pole antenna outwardly projecting from the rearward portion of the vehicle and a high-frequency pickup device mounted in one of the front pillars of the vehicle body.
Figure 2:
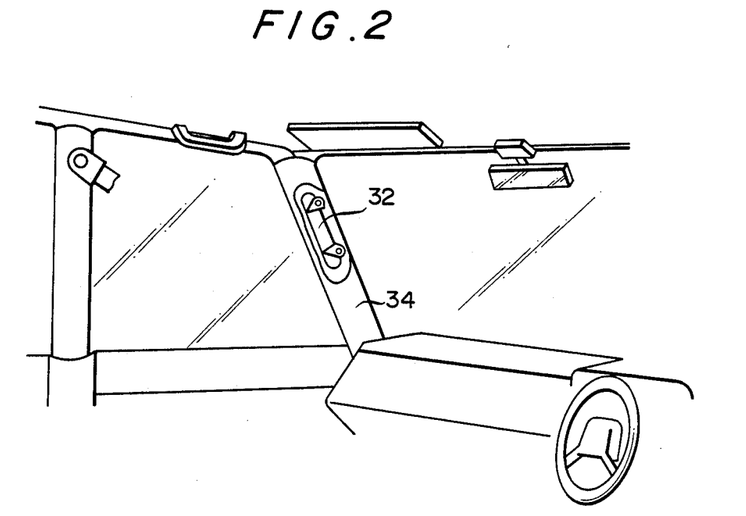
FIG. 2 illustrates the position of the high-frequency pickup device in the front pillar.

Referring now to FIGS. 1 and 2, there is shown a space diversity reception type automotive antenna system according to the present invention which comprises a pole antenna 35 mounted on the rearward portion of an automobile and a high-frequency pickup device 32 mounted in one of the front pillars 34 which is at the side of the vehicle body opposite to the pole antenna 35. This positioning is in accordance with the directional pattern of the automotive antenna system.

There is known in the art that the space diversity reception system is advantageous if it has a pair of antenna elements spaced from each other a distance equal to $\lambda/2$ (where $\lambda$ is the wavelength). In a preferred antenna system for FM radio bands, the pole antenna 35 is spaced from the high-frequency pickup 32 a distance substantially equal to two meters. Since the wavelength of the FM bands is equal to about 4.25 meters, such an antenna system has a very improved reception effect because of space diversity.

Figure 3:
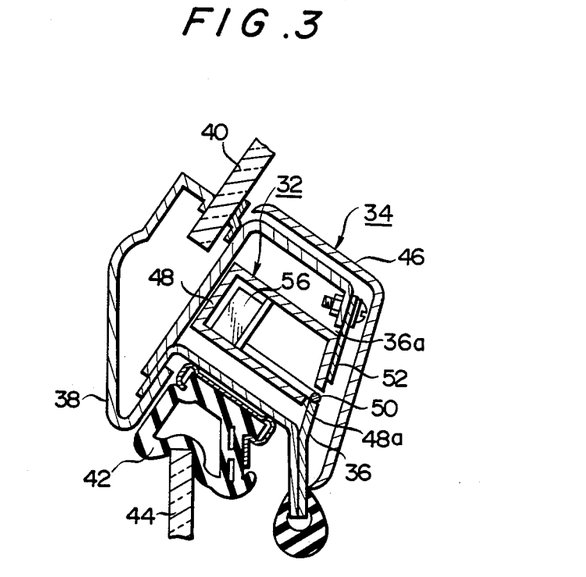
FIG. 3 is a cross-sectional view of an electromagnetic coupling type high-frequency pickup device mounted in the front pillar shown in FIG. 2.
Figure 4:
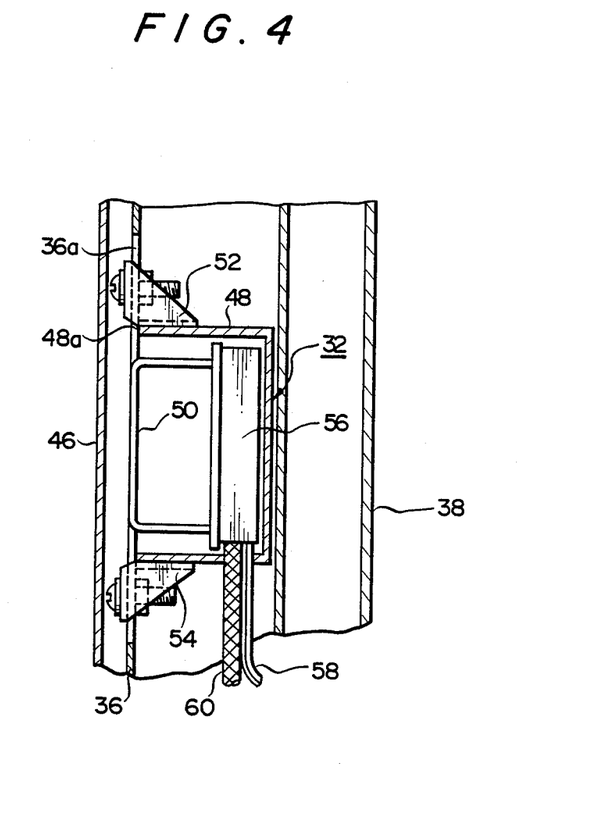
FIG. 4 is a longitudinal section of the primary parts of the construction shown in FIG. 3.

As seen from FIGS. 3 and 4, the high-frequency pickup 32 comprises a casing 48 of electrically conductive material and a loop antenna 50 disposed within the casing and shielded from any undesirable and external waves by the casing 48. The casing 48 is provided with an opening 48a through which a portion of the loop antenna 50 is externally exposed. The exposed portion of the loop antenna 50 is positioned in close proximity to the pillar and particularly its pillar leg plate 36 on which the surface high-frequency currents flow concentrically.

The pillar leg plate 36 is provided with an opening 36a through which the high-frequency pickup 32 can be inserted into the hollow interior of the pillar leg plate 36 before the latter is covered by a front pillar garnish 46.

The casing 48 of the high-frequency pickup 32 includes brackets 52 and 54 fastened thereto at the opposite ends as by spot-welding. As shown in FIGS. 3 and 4, these brackets 52 and 54 are rigidly fastened to the pillar leg plate 36 as by screws such that the high-frequency pickup 32 will fixedly be mounted on the pillar leg plate 36.

Thus, the loop antenna 50 is disposed in close proximity to the edge of said opening 36a in the pillar leg plate 36 such that the loop antenna 50 will efficiently be intersected by a magnetic flux formed by the surface high-frequency currents flowing concentrically in the pillar leg plate 36.

The casing 48 also houses a circuit section 56 including a pre-amplifier and others, which is disposed behind the loop antenna 50. The circuit section 56 is supplied with power and control signals through a cable 58. High-frequency signals detected by the loop antenna 50 are externally fetched through a coaxial cable 60 and then processed by a circuit similar to that used to determine the distribution of surface currents.

In the illustrated embodiment, the loop antenna 50 is in the form of a single-winding coil which is covered by an insulating layer such that the coil can be electrically insulated from and disposed in close proximity to the pillar leg plate 36. Thus, the loop antenna 50 can efficiently be intersected by a magnetic flux formed by the surface high-frequency currents flowing concentrically on the front pillar.

After the high-frequency pickup 32 has been mounted in the front pillar 34 in the manner mentioned above, the front pillar garnish 46 is mounted over the front pillar 34 to provide an aesthetic appearance similar to conventional pillar constructions.

In such a manner, the high-frequency pickup 32 is disposed within the front pillar without any outwardly extending portion such that its loop antenna extending parallel to the length of the front pillar can efficiently detect the surface high-frequency currents flowing concentrically in the front pillar. The high-frequency pickup 32 thus mounted is combined with the pole antenna 35 to define a space diversity reception type antenna system.

Figure 5:
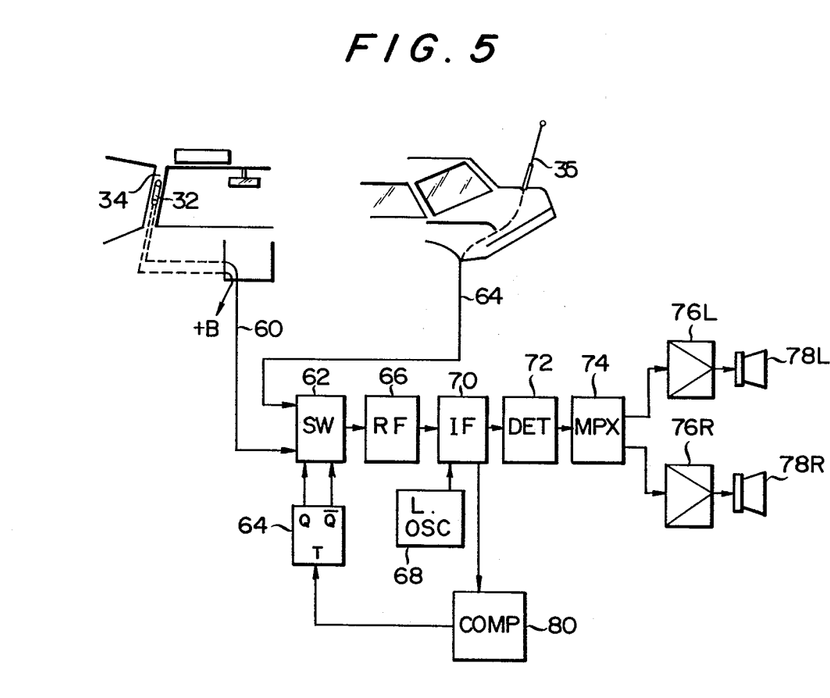
FIG. 5 is a circuit diagram of the automotive antenna system.

Referring next to FIG. 5, there is shown circuitry which can select between antenna elements 32 and 35 so that radio or other waves can more efficiently be received by the selected antenna element 32 or 35.

Such circuitry comprises a switching circuit 62 electrically connected with the high-frequency pickup 32 and pole antenna 35 through coaxial cables 60 and 64, respectively. The switching circuit 62 is adapted to be changed from one state to the other by the output of a T-shaped flip flop 64 which serves as a conditioning circuit as will be described.

Radio or other waves received by one of the antenna elements 32 and 35 selected by the switching circuit 62 are supplied to an intermediate frequency amplifier 70 through a high-frequency amplifier circuit 66, the intermediate amplifier 70 also being connected with a local oscillator circuit 68. Output signals of the intermediate frequency amplifier circuit 70 are detected by a detector circuit 72 to provide only voice signals which in turn are supplied to left- and right-hand audio amplifier circuits 76L and 76R through a multiplexer 74 and then re-produced by two speakers 78L and 78R.

Output signals from the intermediate frequency amplifier circuit 70 also are supplied to a level comparator 80 in which they are compared with a predetermined level. When the level of the output signals from the intermediate frequency amplifier 70 is reduced below the predetermined level, the level comparator 80 gnerates a trigger signal which in turn is supplied to the T-shaped flip flop 64.

When the T-shaped flip flop 64 receives the trigger signal from the level comparator 80, the output thereof is inversed to change the switching circuit 62 from one state to the other. Accordingly, the switching circuit 62 selects one of the antenna elements 32, 35 which can more sensitively receive radio or other waves at that time. Radio or other waves received by the selected antenna element are then supplied to the high-frequency amplifier circuit 66.

Figure 6:
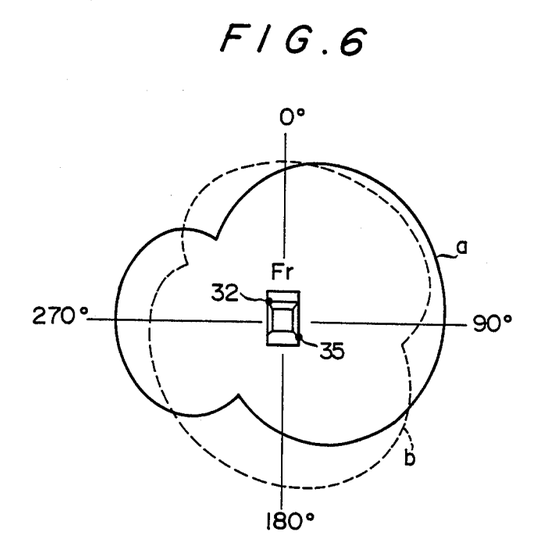
FIG. 6 illustrates the directional patterns of the pole antenna and high-frequency pickup device.

As seen from FIG. 6, the high-frequency pickup 32 on the front pillar 34 has a directional pattern shown by a closed loop a while the pole antenna 35 has a directional pattern shown by a closed loop b. It is thus understood that the antenna elements 32 and 35 are complemented by one another with respect to their sensitivities to improve the directional pattern of the entire antenna system.

Furthermore, the space diversity effect provided by the high-frequency pickup 32 and the pole antenna 35 can reduce multi-path noise. In addition, the high-frequency pickup device can readily be installed on the vehicle body without any outwardly extending portion which would otherwise damage the design of the vehicle body.

The distribution of surface currents aforementioned shows that the surface currents also flow concentrically in the trunk hinges other than the front pillars 34. Since the trunk hinges are spatially remote from the engine of the automobile, they are less influenced by noise to provide signals which are superior in S/N ratio.

Figure 7:
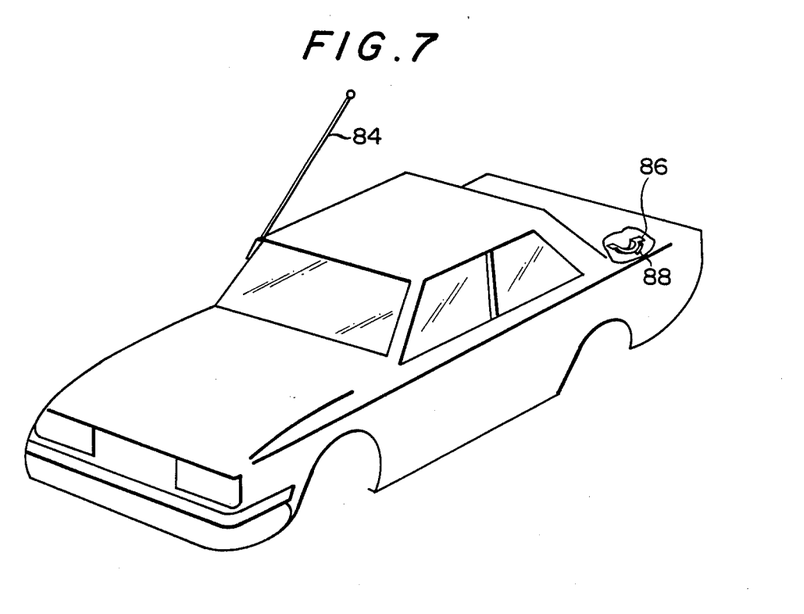
FIG. 7 is a perspective view of an automobile having another embodiment of the space diversity reception type automotive antenna system which comprises a pole antenna mounted on the front right-hand pillar of the vehicle body and a high-frequency pickup device mounted on one of the trunk hinges on the same vehicle body.

Therefore, the present invention also provides another embodiment of the diversity reception type automotive antenna system as shown in FIG. 7. The automotive antenna system comprises a pole type front pillar antenna 84 mounted on one of the front pillars of the vehicle body and a high-frequency pickup device 88 mounted on one of the trunk hinges 86.

Figure 8:
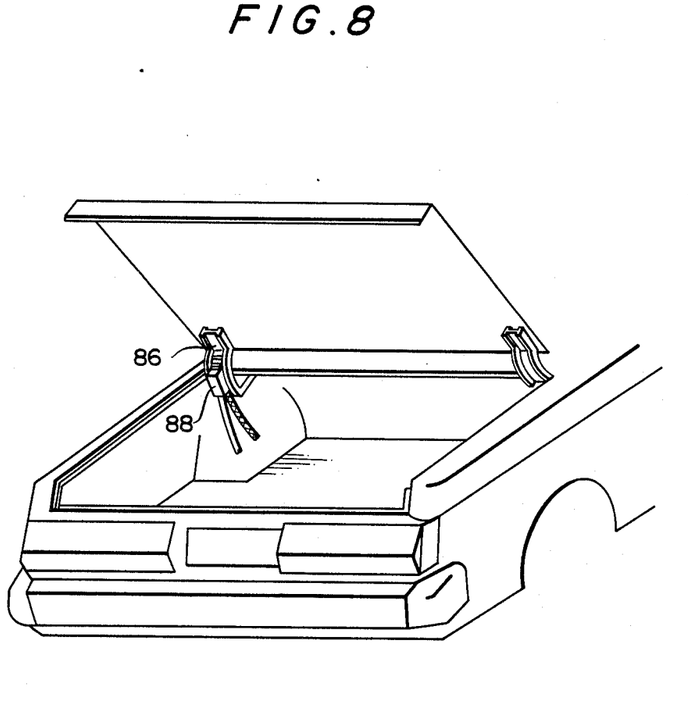
FIG. 8 is a perspective view showing the mounting of the high-frequency pickup device on the trunk hinge.
Figure 9:
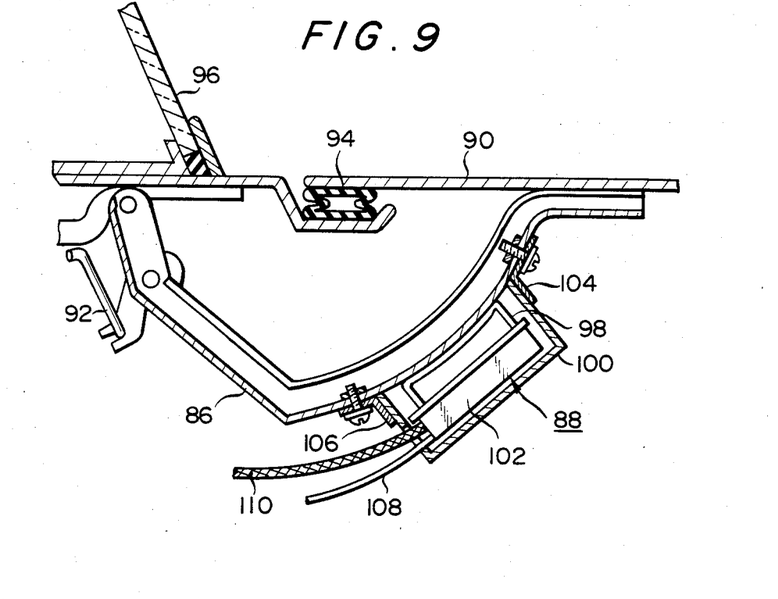
FIG. 9 is a longitudinal section of the primary parts shown in FIG. 8.

The high-frequency pickup 88 is mounted on the trunk hinge in such a manner as shown in FIGS. 8 and 9.

As seen from FIG. 9, the trunk hinge 86 is pivotally connected at one end with the vehicle body, the other end thereof being fixedly connected with a trunk lid 90 so that the latter can be pivoted about the pivot end of the trunk hinge 86. The pivot end of the trunk hinge 86 is provided with a torsion bar 92 which serves to resiliently position the trunk lid 90 when opened. As be is well-known in the art, a water-tight weather strip 94 is located between the trunk lid 90 and the vehicle body to prevent any external water such as rain from penetrating into the interior of the trunk room through a rear-window glass 96.

In the illustrated embodiment, the high-frequency pickup 88 is fixedly mounted on the trunk hinge 86 outside or at the side faced to the trunk room. The high-frequency pickup 88 includes a loop antenna 98 having a length extending parallel to the longitudinal axis of the trunk hinge 86. Thus, the loop antenna 98 can positively and efficiently receive signals induced from surface currents flowing on the trunk hinge 86.

The high-frequency pickup 88 also includes a casing 100 of electrically conductive material within which the loop antenna 98 and a circuit section 102 including a pre-amplifier and other processing circuits are housed. The casing 100 is provided with an opening at the opposite sides of which L-shaped brackets 104 and 106 are fastened to the casing 100. Each of the L-shaped brackets 104 and 106 is rigidly fastened at one end to the trunk hinge 86 to fixedly mount the high-frequency pickup on the trunk hinge. The loop antenna in the casing 100 can detect only a magnetic flux formed by the surface high-frequency currents flowing on the trunk hinge 86 and can be positively shielded from any external flux by the casing 100.

The loop antenna 98 is preferably shaped to be compatible with the curvature of the trunk hinge 86.

The circuit section 102 is supplied with power and control signals through a cable 108. Signals detected by the loop antenna 98 are externally fetched through a coaxial cable 110 and then processed by a circuit similar to that used in determining the distribution of surface currents on the vehicle body.

The loop antenna 98 is in the form of a single-winding coil which is covered by an insulating layer such that the coil can be electrically insulated from and disposed in close contact with the trunk hinge. The loop antenna 98 can efficiently be intersected by a magnetic flux formed by the surface currents such that the high-frequency pickup 88 can detect the surface currents from the trunk hinge 86. The high-frequency pickup 88 is combined with the pole type front pillar antenna 84 to form a space diversity antenna.

Figure 11:
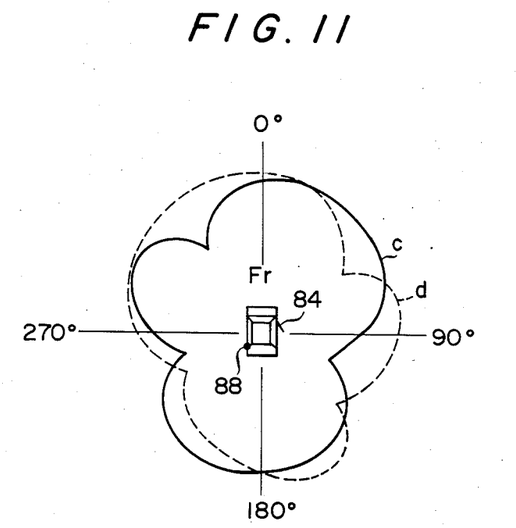
FIG. 11 illustrates the directional patterns of the pole antenna and high-frequency pickup shown in FIGS. 7 to 10.

Since the high-frequency pickup 88 is located on the trunk hinge 86 at the side of the vehicle body opposite to the pole type front pillar antenna 84, the directional patterns of these antenna elements 88 and 84 have the directional patterns respectively shown by loops c and d in FIG. 11, which patterns are complemented by each other with respect to sensitivity. The spacing between the front pillar antenna 84 and the high-frequency pickup 88 is sufficient to provide an improved space diversity effect.

Figure 10:
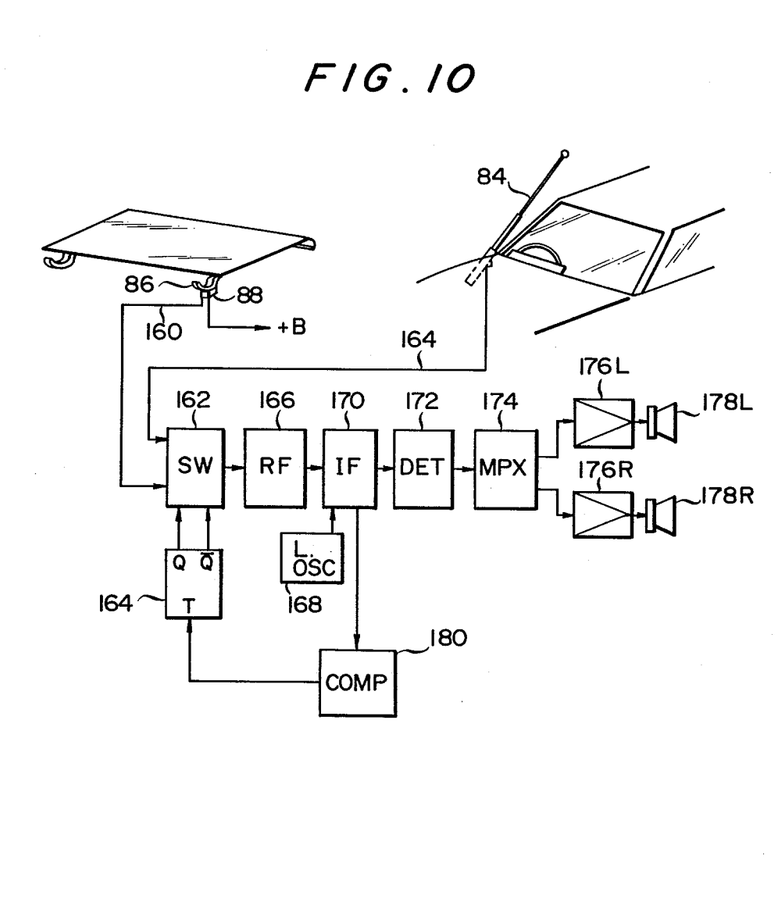
FIG. 10 is a circuit diagram of the automotive antenna system shown in FIGS. 7 to 9.

FIG. 10 shows a circuit for selecting one of the antenna elements 88 and 84 such that radio waves can more sensitively be received at a particular time. This circuit is similar in operation to that of the previously described embodment and therefore will not further be described.

We claim:

1. An automotive antenna system comprising:
a pole type antenna mounted on the vehicle body at a first location; and
high-frequency pickup means mounted on the vehicle body at a second location, connecting adjacent vehicle portions and spaced apart from said first location, said high-frequency pickup means being provided for detecting surface high-frequency currents induced on the vehicle body by radio or other waves flowing on said second location, said pole antenna and high-frequency pickup means comprising a space diversity reception type antenna unit.

2. An automotive antenna system as defined in claim 1 wherein said pole antenna is mounted on the rearward portion of the vehicle body and wherein said high-frequency pickup means is mounted on one of the front pillars of the vehicle body at the side opposite to said pole antenna.

3. An automotive antenna system as defined in claim 2 wherein said high-frequency pickup includes a casing of electrically conductive material and a loop antenna disposed within said casing, said casing having an opening formed therein through which a portion of said loop antenna is externally exposed, the exposed portion of said loop antenna being located facing said one front pillar.

4. An automotive antenna system as defined in claim 1 wherein said pole antenna is mounted on one of the front pillars of the vehicle body and wherein said high-frequency pickup is mounted on one of the trunk hinges of the vehicle body.

5. An automotive antenna system as defined in claim 4 wherein said high-frequency pickup is mounted on the trunk hinge along the length thereof at the side of said trunk hinge faced to the trunk room and wherein said high-frequency pickup includes a loop antenna disposed therein and having a length extending parallel to the length of said trunk hinge.

* * * * *